United States Patent

[11] 3,568,893

[72] Inventor Henry Becker
 4163 Beverly Blvd, Los Angeles, Calif. 90004
[21] Appl. No. 831,606
[22] Filed June 9, 1969
[45] Patented Mar. 9, 1971

[54] DISPENSER
 15 Claims, 12 Drawing Figs.
[52] U.S. Cl. .................................................. 222/362, 222/349, 222/517
[51] Int. Cl. ................................................... G01f 11/10
[50] Field of Search ....................................... 222/362, 363, 364, 517, 531, 349; 221/202, 266

[56] References Cited
UNITED STATES PATENTS

| | | | |
|---|---|---|---|
| 415,010 | 11/1889 | Wiltse | 222/531X |
| 2,050,756 | 8/1936 | Kubo | 222/364X |
| 2,756,902 | 7/1956 | Becker | 221/202 |
| 2,778,536 | 1/1957 | Graves et al. | 222/363X |

Primary Examiner—Robert B. Reeves
Assistant Examiner—Frederick R. Handren
Attorney—William P. Green ABSTRACT: A dispenser for delivering measured quantities of nuts or the like from a supply receptacle, and including a unit forming a bottom wall of the supply receptacle and constructed to retain in position a pivotally movable measuring chamber and a spring element which coacts with the measuring chamber to close off the flow of nuts or other items thereinto upon a pivotal dispensing operation.

PATENTED MAR 9 1971

INVENTOR.
HENRY BECKER

BY William P. Green
ATTORNEY

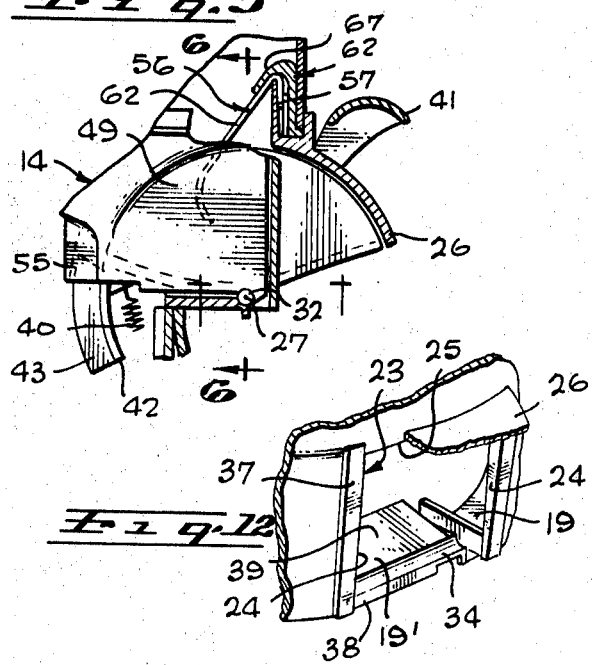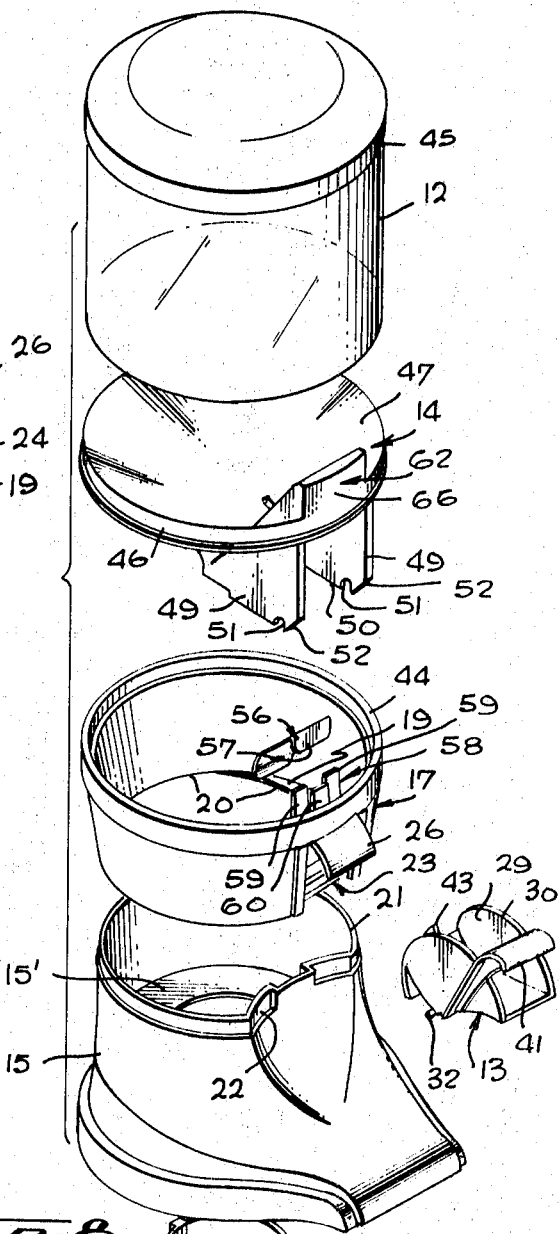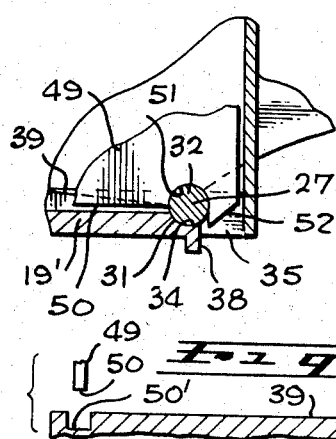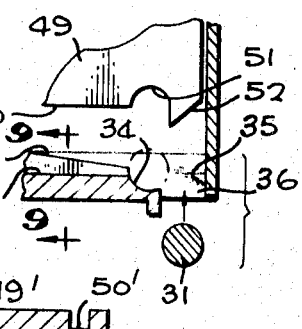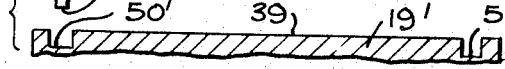

DISPENSER

BACKGROUND OF THE INVENTION

This invention relates to improved dispensing devices for delivering items such as nuts, confections, or the like to a person or persons in measured quantities.

In my prior U.S. Pat. No. 2,756,902, I have disclosed a dispenser of this general type having a supply receptacle for holding a quantity of the material to be dispensed, and from which the items pass by gravity into a measuring chamber. This chamber is mounted to pivot between a first position in which it receives the items to be dispensed from the supply receptacle and a second position in which the items are discharged from the measuring chamber to a person using the device. As the measuring chamber pivots toward its second or dispensing position, communication between the chamber and the supply receptacle is gradually closed off, by movement of a portion of the pivotal chamber toward a spring element, which is resiliently deformable in the dispensing position of the measuring chamber to prevent crushing of any of the items being dispensed as the chamber swings.

SUMMARY OF THE INVENTION

The dispenser of the present invention constitutes an improvement on the above discussed dispenser of my prior patent, for greatly facilitating manufacture and assembly of the device, improving the effectiveness with which the various parts such as the pivotal measuring chamber and coacting spring are retained, and otherwise improving the construction and operation of the device. For example, in the previous arrangement, the measuring chamber was mounted for its pivotal movement by a separately formed shaft whose opposite ends projected into recesses in the body of the device. In actual manufacture of the prior product, it was necessary to form the body of the device of two halves meeting along a vertical central line in order to enable such reception of the ends of the shaft within opposed recesses in the two halves respectively. Besides the complication of this assembly procedure, such formation of the body structure of two halves meeting along a vertical line produced a relatively undesirable external appearance of the body because of the obviousness of the vertical line of connection between the two halves.

To avoid these problems, the present invention teaches mounting of the pivotal measuring chamber in a unique manner eliminating the necessity for separation of the body of the device along its vertical central line, and also enabling mounting of the chamber without use of a separately formed mounting shaft if desired. Specifically, the parts of the dispenser are so formed that the unit which forms the bottom wall of the supply receptacle can itself function to lock or retain the measuring chamber in proper position relative to the body of the device, and in a relation enabling the desired pivotal movement of the chamber. More particularly, the chamber may have a bearing surface or surfaces which engage and rest on the body of the device in pivotally supported relation, and which are retained in proper assembled position on the body by movement of the bottom wall of the supply receptacle to its assembled position. Preferably, the bottom wall of the receptacle has portions which project downwardly at opposite sides of the measuring chamber and which are engageable with the upper and front sides of two pivotal lugs formed on and integrally with the measuring chamber to retain the latter pivotally.

An additional feature of the invention relates to the manner in which the same unit forming the bottom wall of the supply receptacle functions to retain the previously mentioned spring in proper assembled relation with respect to the body of the device. For this purpose, the spring may have a portion which is movable downwardly into interfitting retained relation with respect to an upwardly projecting portion of the body, with the bottom wall of the supply receptacle then being movable downwardly to a position in which it confines the spring against upward separating movement from the body of the dispenser.

BRIEF DESCRIPTION OF THE DRAWINGS

The above and other features and objects of the invention will be better understood from the following detailed description of the typical embodiment illustrated in the accompanying drawings, in which.

Figure 1:
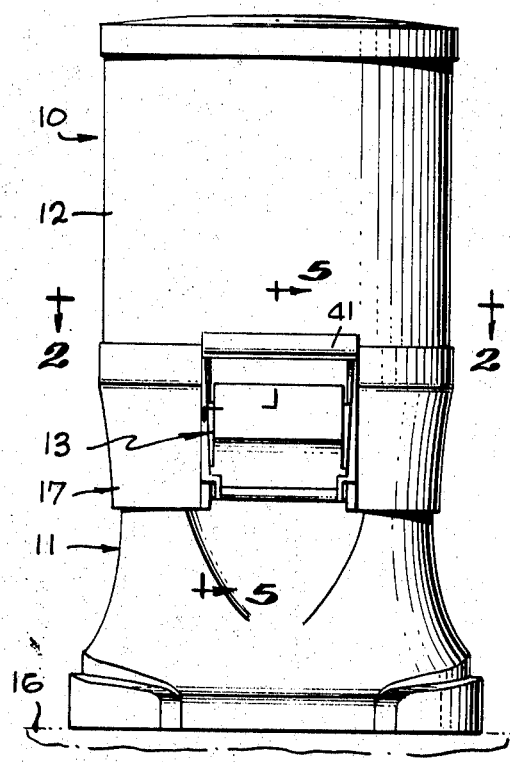
FIG. 1 is a front elevational view of a dispenser embodying the invention.
Figure 3:
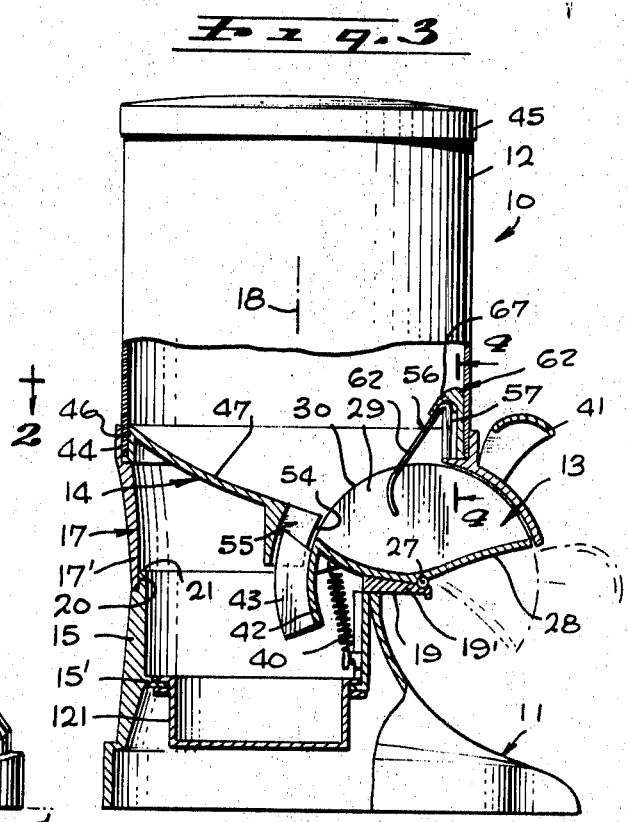
FIG. 3 is a vertical essentially central section taken on line 3—3 of FIG. 2.
Figure 11:
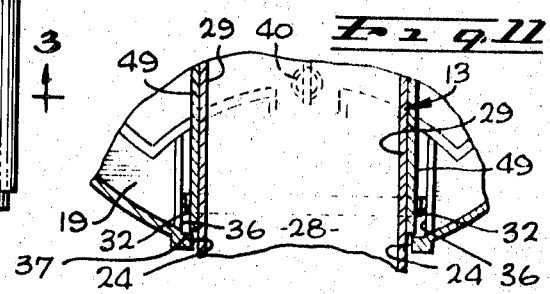

FIG . 4 is a fragmentary enlarged vertical section taken on line 4—4 of FIG. 3;

FIG. 5 is fragmentary vertical section taken on line 5—5 of FIG. 1;

FIG. 6 is an enlarged fragmentary vertical section taken on line 6—6 of FIG. 5;

FIG. 7 is an enlarged fragmentary section taken on line 7—7 of FIG. 6;

FIG. 8 is a view similar to FIG. 7, but showing the manner in which the measuring chamber is moved into its assembled position;

FIG. 9 is a fragmentary vertical section taken on line 9—9 of FIG. 8;

FIG. 10 is an exploded perspective view of the entire dispenser;

FIG. 11 is a fragmentary horizontal section taken on line 11—11 of FIG. 5; and

FIG. 12 is a fragmentary perspective view of the front of the device with the pivotal chamber removed.

DESCRIPTION OF THE PREFERRED EMBODIMENT

Referring first to FIGS. 1 and 3, I have illustrated at 10 a dispenser constructed in accordance with the invention, and including a body or base structure 11 to which there is mounted a supply receptacle 12 for receiving a supply of nuts, candy or the like to be dispensed through and from a pivotal measuring chamber 13. A unit 14 forms the bottom wall of the supply receptacle, and preferably is shaped as a funnel for directing the items to be dispensed downwardly into measuring and dispensing chamber 13.

The body 11 may be formed as a single part, but preferably is manufactured of a plurality of sections molded separately of resinous plastic material or the like. More specifically, the body may include a hollow lower portion 15 adapted to rest on and be supported by a table or other surface 16, and to which there is connected an upper essentially tubular body section 17 centered about the main vertical axis 18 of the device. The sidewall 17' of section 17 may taper downwardly as shown to the level of a generally horizontal bottom wall 19 of that section (FIGS. 3, 10 and 11), which wall is located primarily at the front of the device, and may be discontinued completely at the rear of the device, and forms with a rear portion of vertical wall 17' an opening 20 shaped in correspondence with an upper edge portion 21 of lower section 15 of the body, to fit closely about that upper edge portion and be permanently secured thereto by appropriate cement. As seen best in FIG. 10, the upper edge portion 21 of body section 15 is annular except at a forward location 22 where this edge may be recessed inwardly to enable a forward portion of the bottom wall 19 of section 17 to function as a ledge 19' (FIGS. 3 and 12) on which the pivotal measuring chamber 13 is received. At a location spaced beneath its upper portion 21, the bottom section 15 of the body may have a horizontal wall 15' (FIG. 3), containing an opening within which a bottom closure element 121 is removably connectable by a bayonet connection, so that any materials such as salt or the like which may fall downwardly from the items being dispensed may accumulate in this closure 121 for ultimate removal therefrom.

As seen best in FIG. 12, which shows a portion of the dispenser body with the measuring chamber removed, the two body sections form together a front rectangular opening 23 through which the items held in receptacle 12 are dispensed. This opening 23 is defined at its opposite sides by two parallel approximately vertical side edges 24 formed by top section 17 of the body, and an upper horizontal edge 25 of the opening from which a retaining shield or guard 26 projects and curves downwardly and outwardly. This guard 26 curves arcuately about the horizontal pivotal axis 27 of measuring chamber 13, as seen in FIGS. 3 and 5, and closes the upper side of the measuring chamber as it swings downwardly toward the broken line dispensing position of FIG. 3. With reference again to FIG. 12, the previously mentioned horizontal wall 19 and its ledge portion 19' are located at the bottom of front opening 24 in the housing, to support the measuring chamber.

Chamber 13 has a bottom wall 28 (FIG. 3) which in the full line position of FIG. 3 extends approximately horizontally, though curving slightly upwardly as it advances rearwardly from the location of axis 27, and also curving slightly upwardly as it advances forwardly from the location of that axis. Extending upwardly at its opposite sides, and disposed perpendicular to pivotal axis 27, the measuring chamber 13 has two opposite parallel vertical sidewalls 29, with arcuate peripheral edges 30 centered about axis 27 and of a radius to fit closely within opening 24 and outwardly projecting arcuate guard or shield 26. At its underside, measuring compartment 13 has a bearing portion with a cylindrical bearing surface 31 centered about axis 27 and extending continuously across the entire width of chamber 13. This bearing surface desirably extends about axis 27 through at least about 180° (FIGS. 3, 6, 7 and 8), continuously between the two opposite sidewalls 29 of the chamber. Also, laterally beyond the sidewalls 29, the material of the chamber 13 forms two oppositely projecting stub shafts 32 (FIG. 6), which are cylindrical about axis 27 and of a diameter corresponding to the diameter of partial cylindrical surface 31, so that the undersurfaces of lugs 32 form continuations of partial cylindrical bearing surface 31, which therefore is continuous from the extremity 33 of one of the lugs 32 to the corresponding extremity of the other lug.

To coact with bearing surface 31 of the measuring compartment, ledge 19' of body 11 has an upwardly facing partial cylindrical second bearing surface 34 (FIGS. 6, 7 and 12), centered about pivotal axis 27 and of a diameter corresponding to that of surface 31, to engage surface 31 in supporting relation (FIG. 7), while enabling downward and forward swinging movement of measuring compartment 13 to the broken line dispensing position of FIG. 3. This surface 34 has a circular extent less than the circular extent of surface 31, typically having the approximately 90° circular extent illustrated in FIG. 7, and is spaced rearwardly from but essentially parallel to the two essentially vertical side edges 24 of front opening 23 of the body. Just forwardly of bearing surface 34, ledge 19' is cut away to form a horizontally elongated slot or opening 35 (FIG. 7) through which mounting lugs or stub shaft portions 32 of the compartment, and the intermediate mounting portion of the compartment on which surface 31 is formed, may move upwardly during assembly of the device. More particularly, as seen best in FIG. 11, the opposite ends of this slot are formed as two notches 36 in ledge 19' extending laterally just behind the edge portions 37 of body section 17 adjacent edges 24. The back of slot 35 is defined by a forward edge 38 of ledge 19', while the front of the slot opens forwardly except at the location of the two end notches 36.

Rearwardly of bearing surface 34, ledge 19' may have an upper surface 39 (FIG. 8), which inclines slightly upwardly as it advances rearwardly to engage the undersurface of measuring compartment 13 and support it in the FIG. 3 position. The compartment is yieldingly urged to this position by a coil spring 40 (FIG. 3), which is connected at its upper end to the rear portion of the compartment, and at its lower end to the interior of body section 15.

Compartment 13 is actuable manually to its broken line dispensing position of FIG. 3 by means of a handle 41, which is connected at its opposite ends to the two vertical sidewalls 29 of the compartment, and which bridges across the upper side of shield 26. At its back side, the compartment 13 may have a portion 42 (FIGS. 3, 5 and 10), which curves cylindrically about axis 27 at a radius corresponding substantially to the radius of peripheral edges 30 of compartment sidewalls 29, and carries a vertically extending essentially planar fin 43, lying in a plane disposed transversely of axis 27 and intersecting approximately the center of the width of the compartment.

Supply receptacle 12 may be cylindrical about vertical axis 18 of the device, and be transparent to enable viewing of the items to be dispensed which are contained within the receptacle. The lower edge of receptacle 12 is received within upper annular horizontal edge 44 of body section 17, and may be cemented to edge 44, with the top of the receptacle being closed by a removable frictionally retained cover 45.

Unit 14 which forms the bottom wall of receptacle 12 has an annular vertically extending peripheral edge surface 46, which is a close fit within the interior of the bottom edge portion of receptacle 12, and may be cemented thereto in the assembled condition of the dispenser. As the bottom wall unit 14 advances inwardly toward axis 18 from peripheral edge surface 46, it forms a downwardly inclined and advancing support surface 47 on which the nuts or other items to be dispensed are supported, and functioning essentially as a funnel for directing the items by gravity flow through an inclined rectangular opening 48 formed in the forward portion of unit 14 at the location of chamber 13. At opposite sides of this opening 48, unit 14 has two vertical parallel downwardly projecting sidewalls 49, disposed perpendicular to pivotal axis 27 of chamber 13, and extending downwardly at the outer sides of and closely confining the two sidewalls 29 of chamber 13. These two walls 49 have bottom horizontal edges 50 which may be partially received within two parallel rearwardly extending grooves 50' (FIG. 9) formed in the ledge at opposite sides of inclined surface 39. At the forward extremities of these edges 50, sidewalls 49 contain downwardly facing semicircular notches 51, which in the assembled condition of the device are engageable downwardly against the upper sides of pivot lugs 32 of chamber 13, and serve as bearing surfaces coacting with the previously mentioned bearing surface 34 (FIG. 7) for confining and locating lugs 32 in a manner mounting chamber 13 for only pivotal movement about axis 27. At the forward sides of lugs 32, sidewalls 49 of unit 14 have downwardly projecting portions 52 which block forward movement of lugs 32, and positively prevent the lugs from moving forwardly and then downwardly through notches 36 of slot 35.

Along the rear edge 53 of rectangular inclined opening 48 in receptacle bottom wall unit 14, this unit has a downwardly extending wall 54 disposed arcuately about pivotal axis 27, to movably and closely receive portion 42 of chamber 13. At the center of this wall 54, unit 14 has vertically extending walls 55 defining a guideway closely receiving and confining fin portion 43 of chamber 13. In the nondispensing full line position of FIG. 3 of chamber 13, fin 43 is retracted downwardly within the guideway formed by walls 55, whereas upon movement of the chamber 13 to the broken line dispensing position of FIG. 3, fin 43 moves upwardly out of the guideway to contact the nuts or other items at the top of funnel unit 14, and agitate those items just enough to prevent their lodging or sticking in nonfeeding conditions.

Figure 4:
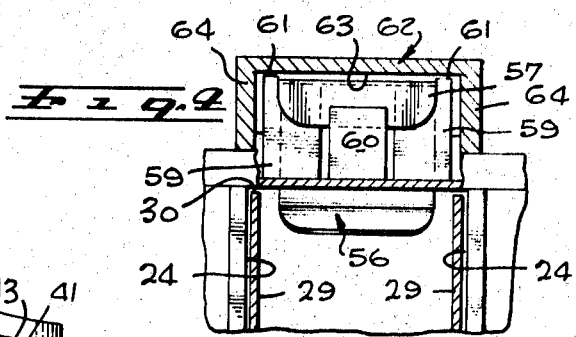

As the measuring chamber 13 swings forwardly and downwardly toward its broken line position of FIG. 3, the rear edge of the chamber moves forwardly toward a downwardly extending resilient leaf spring 56 (FIGS. 3 and 5), to gradually close the filling space between the chamber and spring, and in this way permit only a predetermined single measured quantity of items to be dispensed upon each forward swinging motion of the chamber. Flexure of the spring 56 prevents damage to the items or confections being dispensed while still attaining the desired shutoff action. Spring 56 is mounted by providing the spring with an upper portion 57 which extends downwardly in a vertical plane at a location within the lower forward portion of receptacle 12. To coact with mounting portion 57 of the spring, body section 17 carries at a location within its interior an upwardly projecting spring mounting portion 58, taking the form of two spaced planar fingers 59 (FIG. 4) disposed within a first vertical plane, and a third intermediate planar finger 60 disposed within a second parallel but slightly offset plane, with the spacing between finger 60 and fingers 59 being just wide enough to receive and closely confine the downwardly projecting mounting portion 57 of the spring. The upper edges of the two fingers 59 may be notched slightly to provide short projections 61 extending upwardly at opposite sides of the spring for confining the spring against lateral movement. After extending upwardly about the upper ends of fingers 59, the spring extends downwardly and forwardly at 62 to a lower curving end of the spring located within measuring chamber 13.

Figure 2:
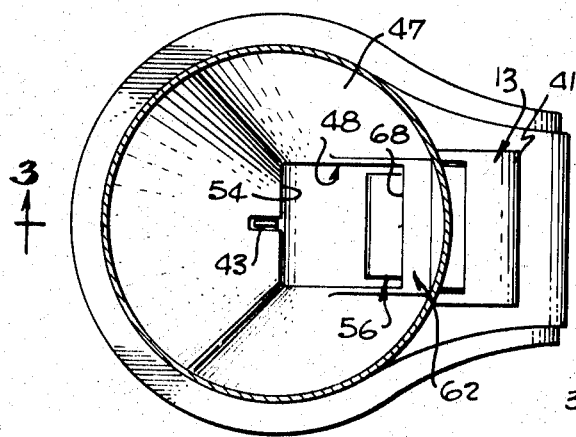
FIG. 2 is a horizontal section taken on line 2—2 of FIG. 1.

Extending about fingers 59 and 60 and the upper portion of spring 56, the receptacle bottom wall or funnel member 14 has a hollow portion 62, having a horizontal undersurface 63 which is engageable downwardly against fingers 59 and the spring in a manner effectively confining the spring on the upper ends of the fingers and preventing removal of the spring therefrom. This portion 62 of unit 14 may define a part of the previously mentioned rectangular opening 48 of FIG. 2, and for this purpose may have upwardly extending parallel vertical sidewalls 64 forming essentially upward continuations of previously mentioned vertical walls 49, with arcuate shoulders or edges 65 following the contour of the peripheral arcuate edges of measuring compartment walls 29. At its front side, portion 62 of unit 14 may have a partial cylindrical vertical front wall 66 aligned vertically with and forming a continuation of peripheral surface 46 of unit 14. At its rear side, portion 57 may have an inclined wall 67 (FIG. 3) extending downwardly a short distance and terminating at and defining an edge 68 of opening 48 in FIG. 2.

In assembling the dispenser, body sections 15 and 17 may first be cemented together along their engaging edges, and the measuring compartment 13 may then be slipped rearwardly through the front opening 23 of the housing (FIG. 12), with pivotal lugs 32 first being moved to the full line position of FIG. 8, and then being moved upwardly through notches 36 and then rearwardly to the broken line position of FIG. 8. During such movement of the pivot lugs and the measuring compartment with which they are molded integrally, the arcuate shield portion 26 of the body may be resiliently deflected slightly to allow the desired insertion of the measuring compartment into position. The spring 56 may next be slipped downwardly to its FIGS. 3 and 4 position of interfitting engagement with fingers 59 and 60, following which unit 14 is moved downwardly to its assembled FIG. 3 position, so that its depending sidewalls 49 may engage the upper sides of pivot lugs 32 of the measuring chamber, in the FIGS. 6 and 7 position, and lock those pivot lugs against forward removal from bearing engagement with bearing surface 34 of the body. Also, the downward movement of unit 14 causes portion 62 of that unit to engage the upper side of the top portion of spring 56 in a manner simultaneously locking the spring against detachment. Thus, unit 14 effectively retains both the spring and measuring compartment in their assembled positions, while still allowing flexure of the free portion of the spring, and allowing pivotal movement of the measuring compartment. Receptacle 12 is cemented to unit 14 either before or after its downward movement into assembled relation with respect to the body and the body carried parts. Coil spring 40 is attached to the underside of the measuring compartment and to the interior of the body, and closures 21 and 45 are detachably secured to their coacting parts.

To use the device, receptacle 12 is filled with nuts, confections, or any type of items to be dispensed, cap 45 is then attached to the top of the receptacle to close it, and a user may then dispense into his hand a measured quantity of the items within the receptacle by manually actuating handle 41 and the attached chamber 13 from the full line position of FIG. 3 to the broken line position of that FIG., in which the contents of the chamber fall downwardly from the forward end of the chamber and past shield 26. When the chamber 13 is returned to its full line position by coil spring 40, a next measured quantity of the items within receptacle 12 falls downwardly into the rear portion of chamber 13, to be dispensed upon the next actuation of the chamber.

While a certain specific embodiment of the present invention has been disclosed as typical, the invention is of course not limited to this particular form, but rather is applicable broadly to all such variations as fall within the scope of the appended claims.

I claim:

1. A dispenser comprising a body structure, a receptacle carried by said body structure for containing items to be dispensed, a unit forming a bottom wall of said receptacle for supporting said items and containing an opening through which said items may be discharged from the receptacle, a pivotal measuring chamber for receiving a quantity of said items from the receptacle and dispensing them to a recipient, said body structure having bearing surface means formed thereon on which said chamber is supported pivotally, said measuring chamber having pivot lugs projecting in opposite directions, and said unit having portions engageable with said lugs in a relation confining said lugs pivotally and blocking removal of the chamber from the body structure.

2. A dispenser as recited in claim 1, in which said bearing surface means include upwardly facing bearing surfaces on said body structure on which said lugs are supported pivotally.

3. A dispenser as recited in claim 1, in which said body structure is shaped forwardly of said lugs to pass said lugs rearwardly during assembly of the dispenser, said portions of said unit being received forwardly of said lugs and blocking forward withdrawal thereof.

4. A dispenser as recited in claim 1, in which said body structure has passages forwardly of said lugs through which said lugs pass during assembly of the dispenser, said portions of said unit being received forwardly of said lugs and blocking withdrawal thereof through said passages.

5. A dispenser as recited in claim 1, in which said bearing surface means include upwardly facing bearing surface areas on the body structure on which said lugs are pivotally supported, said body structure containing slots forwardly of said bearing surface areas through which said lugs are movable upwardly during assembly of the dispenser for subsequent movement rearwardly onto said bearing surface areas, said portions of said unit being received forwardly of said lugs and preventing forward withdrawal thereof to said slots.

6. A dispenser as recited in claim 1, in which said portions of said unit are movable downwardly during assembly to positions above said lugs for blocking upward movement thereof and confining said lugs pivotally.

7. A dispenser as recited in claim 1, in which said portions of said unit are movable downwardly during assembly to positions above and in front of said lugs to block both upward and forward movement thereof.

8. A dispenser as recited in claim 1, in which said bearing surface means include upwardly facing bearing surface areas on the body structure on which said lugs are pivotally supported, said body structure containing slots forwardly of said bearing surface areas through which said lugs are movable upwardly during assembly of the dispenser for subsequent movement rearwardly onto said bearing surface areas, said portions of said unit projecting downwardly at opposite sides of said pivotal measuring chamber and having lower edges received above and forwardly of said lugs in a relation confining said lugs pivotally and preventing upward or forward movement thereof.

9. A dispenser comprising a body structure, a receptacle carried by said body structure for containing items to be dispensed, a unit forming a bottom wall of said receptacle for supporting said items and containing an opening through which said items may be discharged from the receptacle, a pivotal measuring chamber for receiving a quantity of said items from the receptacle and dispensing them to a recipient, a spring located near said opening and toward which said chamber moves in dispensing said items and adapted to flex to prevent damage to the items by the chamber, and a spring mounting structure carried by said body structure, said unit having a portion received opposite said mounting structure in a relation confining and retaining a mounting portion of said spring therebetween.

10. A dispenser as recited in claim 9, in which said mounting portion of the spring is received above said mounting structure, and said portion of said unit is received above said mounting structure in a relation blocking upward withdrawal of the spring therefrom.

11. A dispenser as recited in claim 9, in which said mounting portion of the spring projects downwardly into interfitting confined relation with respect to said mounting structure.

12. A dispenser as recited in claim 9, in which said mounting portion of the spring projects downwardly into interfitting confined relation with respect to said mounting structure, said mounting structure having a plurality of upwardly projecting arms engaging opposite sides of said mounting portion of the spring.

13. A dispenser as recited in claim 9, in which said mounting portion of the spring projects downwardly into interfitting confined relation with respect to said mounting structure, said mounting structure having a plurality of upwardly projecting arms engaging opposite sides of said mounting portion of the spring, said portion of said unit having a downwardly facing surface essentially above and opposite the upper ends of said arms and confining said spring between said arms and said portion of said unit.

14. A dispenser as recited in claim 9, in which said measuring chamber has pivot lugs projecting therefrom, and said unit has portions engageable with said lugs in a relation confining said lugs and blocking removal of the chamber from the body structure.

15. A dispenser as recited in claim 9, in which said measuring chamber has pivot lugs projecting therefrom, and said unit has portions projecting downwardly at opposite sides of said chamber and engageable at lower edges thereof with said lugs in a relation confining said lugs pivotally and blocking upward and forward movement thereof.